(12) United States Patent
Trubert

(10) Patent No.: US 6,459,064 B1
(45) Date of Patent: Oct. 1, 2002

(54) ASSEMBLING ELECTROCONDUCTIVE PARTS BY ELECTRIC CURRENT HEATING

(75) Inventor: Franz Trubert, Vienna (AT)

(73) Assignee: Magna IHV Gesellschaft fur Innenhochdruck—Verfahren mbH, Bopfingen (DE)

( * ) Notice: Subject to any disclaimer, the term of this patent is extended or adjusted under 35 U.S.C. 154(b) by 0 days.

(21) Appl. No.: 09/485,593
(22) PCT Filed: Jul. 24, 1998
(86) PCT No.: PCT/DE98/02091
§ 371 (c)(1), (2), (4) Date: May 8, 2000
(87) PCT Pub. No.: WO99/08825
PCT Pub. Date: Feb. 25, 1999

(30) Foreign Application Priority Data

Aug. 14, 1997 (DE) .......................................... 197 35 219
Dec. 22, 1997 (DE) .......................................... 197 35 394

(51) Int. Cl.7 .............................. B23K 1/00; B23K 11/10
(52) U.S. Cl. ................ 219/85.1; 219/85.15; 219/85.22; 219/86.9
(58) Field of Search ............................ 219/85.1, 85.14, 219/85.15, 85.22, 86.9

(56) References Cited

U.S. PATENT DOCUMENTS

| | | | |
|---|---|---|---|
| 2,045,523 A | | 6/1936 | Fassler |
| 2,137,909 A | * | 11/1938 | Hagedorn |
| 2,272,968 A | * | 2/1942 | Dyer |
| 3,089,020 A | * | 5/1963 | Hurlebaus |
| 3,284,606 A | * | 11/1966 | Schroeppel |
| 3,435,181 A | * | 3/1969 | Walkow |
| 3,435,184 A | * | 3/1969 | Schroeppel et al. |
| 3,462,577 A | | 8/1969 | Helms et al. |
| 3,478,190 A | * | 11/1969 | Dawes |
| 3,573,422 A | * | 4/1971 | Langenbach |
| 3,660,632 A | * | 5/1972 | Leinkram |
| 3,761,672 A | * | 9/1973 | Baker et al. |
| 4,208,568 A | * | 6/1980 | Bakewicz et al. |
| 4,614,855 A | * | 9/1986 | Hinden |
| 4,870,240 A | * | 9/1989 | Fiedelius |
| 4,876,430 A | | 10/1989 | Herschitz et al. |
| 4,910,376 A | * | 3/1990 | Riley et al. |
| 5,126,527 A | | 6/1992 | Haehner |
| 5,229,568 A | | 7/1993 | Gobez et al. |

\* cited by examiner

Primary Examiner—M. Alexandra Elve
Assistant Examiner—Colleen Cooke
(74) Attorney, Agent, or Firm—Pillsbury Winthrop LLP

(57) ABSTRACT

The invention concerns a method for assembling electroconductive pass by electric current heating. Said method is characterised in that it consists in moving forward electrodes (10, 20) with different polanties, towards the parts (30, 40) to be assembled, and in contacting said electrodes with at least one of the pans (30) to be assembled, current being applied to said electrodes (10, 20). Thus, the electroconductive pants (30, 40) are locally heated and assembled by the current flowing through them to pass from one electrode to the other. The invention also concerns a device for implementing said method and its use for assembling hollow parts, tubes or large dimension objects with sheet metal or other hollow parts 8 Claims, 4 Drawing Sheets

ASSEMBLING ELECTROCONDUCTIVE PARTS BY ELECTRIC CURRENT HEATING

Figure 1:
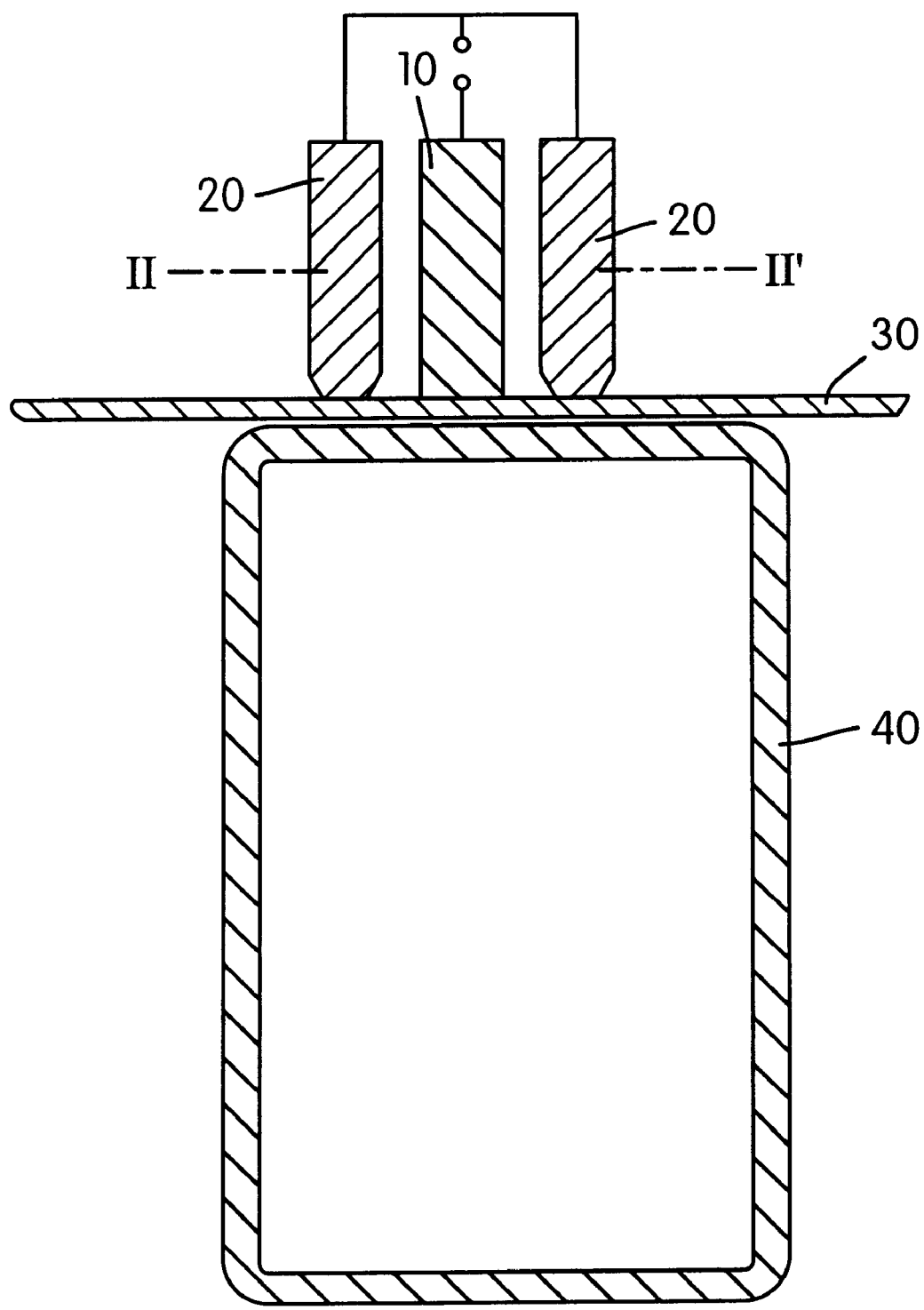

The invention relates to a method for assembling electroconductive parts by electric current heating, a device for its implementation as well as its use.

Until now, electroconductive components, particularly hollow bodies, such as long, closed profiles or big, massive parts that are difficult for electrodes to contact from the underside could be assembled often only through thermal assembly with filler metal, soldering material, or the like.

A disadvantage of this thermal assembly method is that the heat needed for assembly cannot be placed precisely. The parts to be assembled are therefore heated up more than is necessary for the pure assembly process of welding or soldering, and the parts partially lose their dimensional accuracy, or the material suffers a disadvantageous structural deformation (for example, in work-hardened parts that originate from cold forming method, like the internal high-pressure metal forming method explained below in detail. In extreme cases, the preformed part to be assembled loses its shape and a part of its firmness.

Spot welding with laser picker or the like also has other disadvantages.

The internal high pressure process as such is known. Under the mentioned internal pressure method or even the internal high pressure method, the word method is understood as that which was described in the lndustrieanzeiger No. 20, dated Mar. 9, 1984 or even in the "Metallumformtechnik", ID/91 edition, page 15 ff: A. Ebbinghaus: Aviation Type Precision Work Pieces, produced through internal high-pressure metal forming "or Werkstoff und Betrieb" 123 to 243: A. Ebbinghaus: "Economic Construction with internal high-pressure metal formed Precision Pieces" or "Werkstoff und Betrieb" 122, (1991), 11, (1989), page 933 to 938. To avoid repetition, reference will subsequently be made to the disclosure of these publications in full. The method was previously used for the manufacture of hollow parts of various shapes, such as for the manufacture of constructed camshafts to fasten cams to a tube, for the manufacture of hollow camshafts, for the manufacture of steering axles, as well as for the manufacture of vehicle frame parts.

It delivers highly precise, cold-formed parts that have experienced a cold hardening during the shaping and whose fibre run, as determined in the course of a microscopic observation of the ground sections, essentially corresponds to the run of the outer contours of the shaped part. As a result, these parts are very sturdy or light in relation to their strength.

In order to avoid the disadvantageous heating up, particularly of such types of work-hardened whole parts, resistance welding could also be used because the current used there for welding heats up precisely between two or several electrodes, said electrodes of one polarity being called "welding electrodes" and the electrodes of the opposite polarity being called counterelectrodes. One-sided indirect welding, in which a material with very good conductivity (counter copper[1]) is placed under the sheet metals to be assembled, has the disadvantage in that the welding current is prone to shifting, so that welding points are created at points totally different from the desired locations. Such as method for impulse welding, in which the welding electrodes are supplied from one side to the parts for assembly, Furthermore, problems with the achievable welding deposits often occurred with large equipment, all the more the bigger the parts to be welded, the earlier the shunt wounds could occur.

It is therefore the task of the invention to create a method for assembling parts through resistance welding, which can also be used for parts that are easily accessible only from one side.

The task is solved according to the invention through a method for assembling electroconductive parts by heating by means of electric current, in which electrodes of different polarity are supplied from the same side of the parts to be assembled and touch at least one of the parts to be assembled, current is applied to the electrodes, and in such a manner, the conductive parts are heated and assembled through the current flowing from one electrode to the other through the parts to be assembled.

Advantageous developments are in the dependent claims.

To increase the welding deposits, a certain amount of force can be applied to the surfaces/parts to be assembled, thereby improving the electrically capable contact and allowing higher welding current to flow. In the process, the parts may fuse partially or completely in the heated up area, or welding material or solder may be placed for smelting.

As the expert in the field of electrical welding engineering knows, the electrodes can be cooled in a known manner. When superconductive materials, such as special ceramic, are used, the electrodes may of course be cooled appropriately through liquid helium or nitrogen.

The parts may also be assembled by using electroconductive soldering material between the parts, thereby involving a soldering procedure.

In the process, one may be surrounded by one or several counterelectrodes surrounding the same, or the counterelectrodes may enclose the central electrode in a ring shape, or two counterelectrodes, between which the central electrode is placed, may be used.

In cases where the underside of the parts for assembly is accessible, it may be advantageous to place under the electroconductive parts for assembly, on the surface of the compound arrangement opposite the electrodes, a counter material of greater electroconductive capacity than the parts for assembly, in order to improve the current passage through the parts for assembly.

If the parts for assembly exhibit differing electroconductivity, it is preferable to make the conductivity of the part, which is not in contact with the electrodes, higher than that of the part that is contacted by the electrodes.

It is useful to develop, in at least one of the parts for assembly, an opening for the penetration of an electrode and to make contact only with the object behind it so that through this electrode, a potential other than the one to be placed on the upper part can be placed on the lower part, so that current flows between the two, and if necessary, soldering material as well, and this is heated locally for welding/soldering. If the material thickness permits, it makes sense to perform the procedure in such a way that an opening for penetration of one electrode be made, for example, through drilling, stamping, cutting, or the like, before applying of the electrodes.

A device according to the invention for performing the procedure according to any one of the previous claims shows at least two adjacently arranged electrodes, which are insulated from one another and are movable from the same parts towards the parts for assembly; and a power supply for applying high voltage/intensity of current of varying potential to the electrodes of different polarity.

At the same time, this device may comprise a facility for creating openings suitable for the passage of internal electrodes and insulated against the contact with the opening walls.

It is useful for the device to also comprise during the assembly a device for exerting pressure on the electroconductive parts to be assembled because, with better contact between the two parts, the current can flow better through the same. This device may, for instance, be formed by one or several electrodes, but if the underside of the electroconductive parts to be assembled is accessible, it may also comprise the conductive counterpart ("copper back-up bar"), which then interacts with the electrodes.

The electrodes may be shaped in such a way that the counter electrode at least partially encloses the central electrode. Several counterelectrodes, which at least partially enclose a central electrode between them, may also be provided. There may be an insulation material between the electrodes of different polarity.

For instance, an electrode may be shaped as a hollow body, for example, as a hollow cylinder, in which the counterelectrode is axially movable, in such a way that it contacts, through an opening accessible in the upper part, an area of the lower part insulated from the upper part (for example, avoiding the upper part from being touched by the conductive electrode, or a contact taking place only with an electrically non-conductive outer casing of the electrode), and the other electrode contacts the part under it and such types of voltages of different potentials may be created between the two parts.

It is useful to have an insulation material between the electrodes, such as air, an insulating gas, or non-conductive and high-temperature-resistant synthetic material, such as Teflon as well as ceramic. It is preferred for this insulating material to insulate not only electrically, but also thermally, in order to treat the electrode material with care. For many applications, it is particularly advantageous for the inner electrode to be covered by insulation material except on the contact points, for example, a porcelain, synthetic, or other insulating shell, in which the electrode is movable, with the electrode contact being exposed.

It is advantageous if, in the device, a facility for the production of openings is provided, suitable for the passage of the inner electrodes and insulated against contact with the opening walls, said equipment being a drilling equipment, perforating equipment, or cutting equipment, which provides openings only for the upper part or also both parts, such openings providing access to the underlying part for contact with the counter electrode.

A preferred use of the device is the assembly of hollow parts, closed profiles or large and/or thick objects with sheet metal that fie partially flat. Thus, hollow bodies, closed profiles or massive parts can be assembled with sheet metal or other hollow parts. A typical application is the assembly of support parts in vehicle construction, which includes land, air and water vehicles, with sheet metal, a typical area of application being the connection between support parts of the underbody of an automobile with sheet metal, such as floor panels. However, hollow tubes may also be assembled with sheet metal, or the like, in aircraft construction. Corresponding applications are obvious to the expert.

On account of the extremely short current paths from one electrode, through the welding zone, to the other electrode, which the method according to the invention offers, it also seems suitable, in certain cases, where good access on both sides exist, to substitute the spotwelding with counterelectrode using the method according to the invention. Or there, where shunt wounds threaten as a result of too little welding spot distance, or where sheet metal with very different wall thicknesses are supposed to be welded. The risks of shunt wounds, which are a threat in so-called indirect welding (both electrodes on the same side, but not coaxial), are greatly reduced or completely eliminated with the method according to the invention.

Using the attached drawing, which shows the preferred embodiments of the invention, to which, however, this is not at all limited, the invention will now be explained in detail. The following are shown:

FIG. 1: a possible arrangement of the electrodes on a combination of a hollow part with a sheet metal on top for welding.

Figure 2:
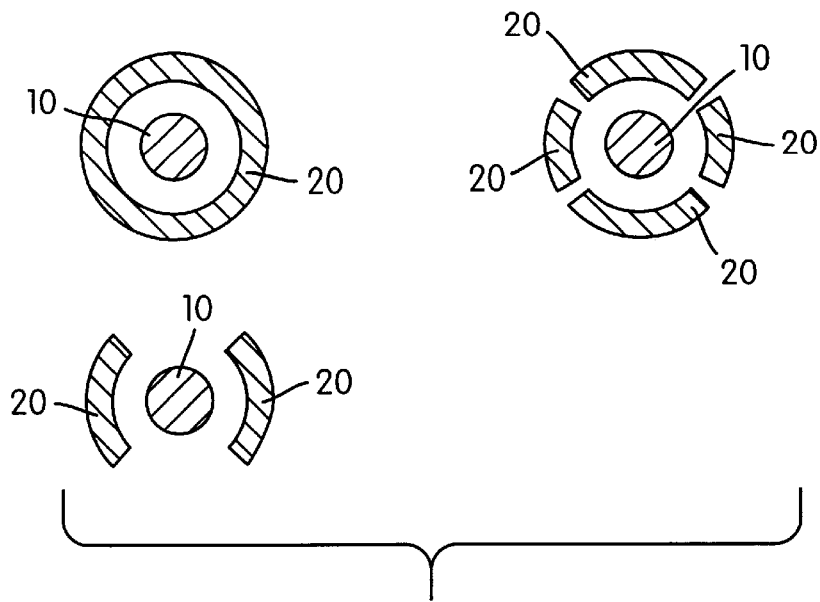

FIG. 2: a section of the arrangement of the electrodes from FIG. 1.

Figure 3:
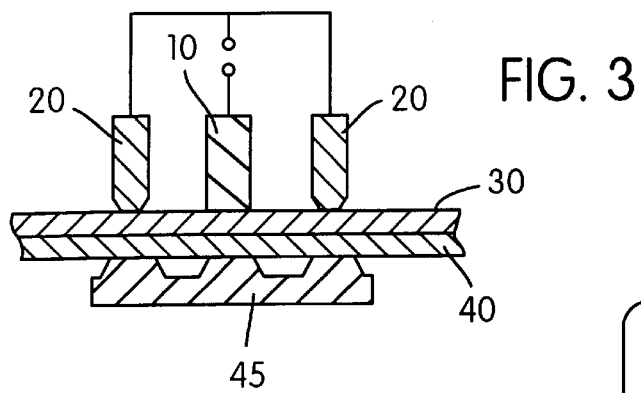
Figure 4:
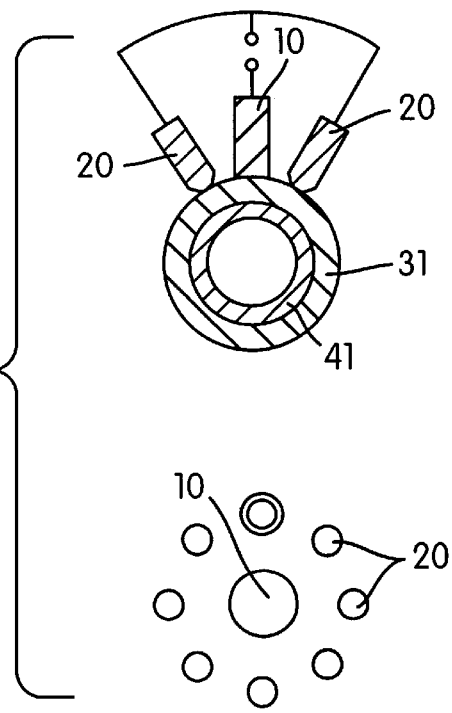
Figure 5:
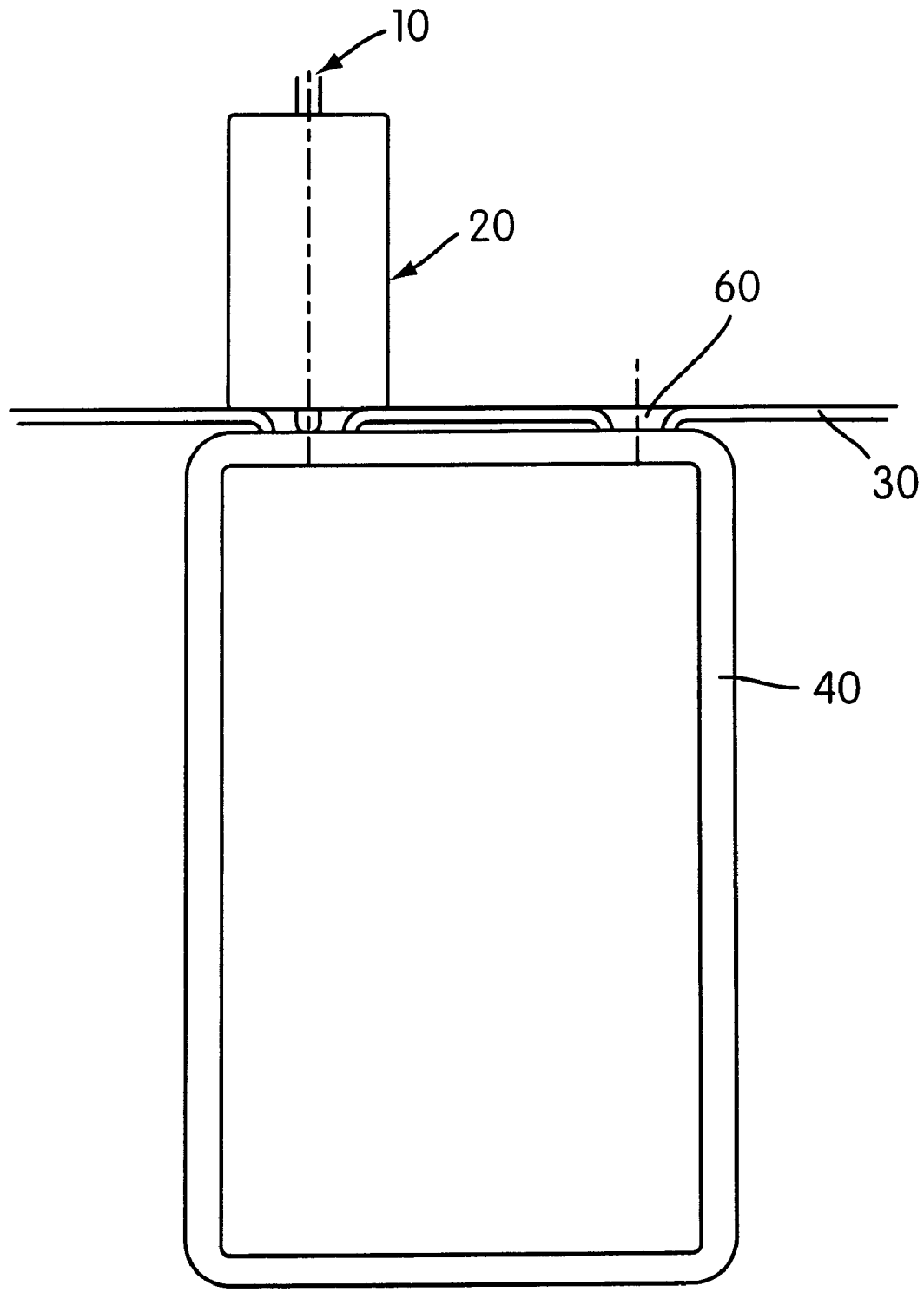
Figure 6:
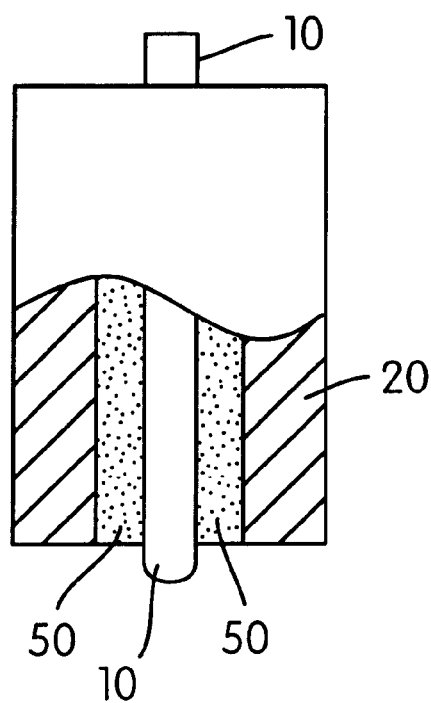

FIG. 3: a further, possible arrangement of the electrodes for marginal assembly of two parts on top of one another;

FIG. 4: a use of the device according to the invention for assembly of hollow parts that fit into one another;

FIG. 5: a possible arrangement of the electrodes on a combination of a hollow part with an overlying sheet metal for welding;

FIG. 6: a section through the arrangement of the electrodes from FIG. 5 and

Figure 7:
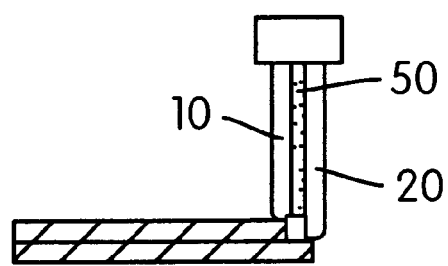

FIG. 7: another possible arrangement of the electrodes for edge assembly of two mating parts As shown in FIG. 1, the resistance assembly according to the invention can be used for assembling sheet metal and hollow bodies 40 with sheet metal 30.

Here, for instance, a 0.8 mm thick ST37 sheet metal is placed in welding position on an ST37 hollow body 40 with a wall thickness of 2.5 mm manufactured through internal high-pressure metal forming. All electrodes 10,20 are brought in electric contact with the outer surface of the sheet metal 30 on top, with the internal electrode being surrounded by two counterelectrodes 20, which are formed here in a circular segment. (Of course, any other form, through which the internal electrode is surrounded by counterelectrodes to avoid the migration of current, without getting in contact with the outer electrode, is possible). Here, a copper alloy, namely CuCr Zr, was used as electrode material, in order to achieve optimal electrical as well as thermal conductivity for a good service life. Of course, other materials that conduct electricity well, which are known to the expert, can be used for the electrodes. After applying a welding arc voltage to the electrodes and the welding current has flowed through the parts to be assembled, that are between the electrodes with different polarity in the environment of the central electrode, a resistance welding process is introduced, with the path of the current corresponding only to about the distance between the central electrode/counterelectrodes plus the sheet thickness. In the process, pressure can be applied axially on the electrode(s) 20 to support the welding process. Parts 30, 40 for assembly can be defined in this manner and assembled with one another in uniform quality.

A further possible arrangement of the electrodes is shown in FIG. 2. This involves a "central electrode" 10, around which two counterelectrodes 20 are formed as parts of a hollow cylinder. Here, it is important for the feed of the electrodes 10, 20 to be variable so that parts of different thicknesses can be assembled with one another. An insulating material, such as ceramic, porcelain, or the like, may be placed between the electrodes to avoid an undesired voltage flash-over between the two electrodes. However, in most cases, insulation through air or gas is sufficient. The expert is familiar with appropriate materials.

FIG. 4 illustrates an application according to the invention on tube parts for fitting into one another. Here, the central electrode 10 as well as the two counterelectrodes 20, which have a small contact surface here, are placed on the outer tube. The welding current then flows between the central electrode and the counterelectrodes while assembling the two hollow parts 31 and 41 fitted into one another.

As illustrated in FIG. 5, the resistance welding assembly according to the invention can be used to assemble hollow bodies 40 with sheet metal 30.

Here, the sheet metal is perforated with or without necking/welding hump and placed by the hollow body 40 in welding position. Through the hole 60, an initial electrode 10 is introduced in such a way that it contacts the outer surface of the hollow part 40 behind it, without touching the overlying part 30. The second electrode 20, which is shaped here as a hollow cylinder (of course, any other hollow form, through which the inner electrode can be moved without coming into contact with the outer electrode, is possible) is axially pushed beyond the first electrode 10 until it has contact with the surface of the perforated sheet metal 30 beside the opening. After applying welding voltage to the electrodes and flow of the welding current through the parts for assembly in the environment of the hole, a resistance welding procedure is introduced, with the path of the current only corresponding roughly to the radian difference of the two electrodes plus the sheet metal thickness. To support the welding process, pressure can be applied axially on at least one electrode(s) 20. As a result, the parts 30, 40 for welding can be defined and assembled with one another in constant quality.

It goes without saying that a plumb bob can also be placed between the parts for assembly and that these parts can also be soldered depending on the requirement and base material and requirements of assembly temperature and type of assembly.

FIG. 6 illustrates a further, possible arrangement of the electrodes. This involves a "stick electrode" 10, around which the second electrode 20 is shaped as a hollow cylinder. Here, it is important for the feed of the electrodes 10, 20 to be variable so that parts of different thicknesses can be assembled with one another. There is insulating material 50, such as ceramic, porcelain or the like between the electrodes, in order to avoid an unwanted voltage flashover between the two electrodes. The expert is familiar with appropriate materials.

FIG. 7 illustrates a further, possible arrangement of the electrodes. Two electroconductive parts are supposed to be assembled with one another here, for instance in their edge area. It is advantageous when the "lower" electroconductive part projects over the "upper" electroconductive part a little. The front electrode 10 can now be placed on the "upper" part and the rear electrode 20 can be placed on the "lower" part, and after applying welding or soldering voltage (if soldering material is placed in between, the assembly process can be introduced once again, the path to be covered by the current roughly corresponding to the distance of the two electrodes 10, 20 plus the material thickness$^2$. Insulation material 50, if required, can in turn be placed between the two electrodes.

Further developments are obvious to the expert within the scope of the extent of the protection of the claims, and the extent of the protection is not at all limited, for instance, to the embodiments cited here, which merely serve to illustrate the invention.

What is claimed is:

1. A method for assembling electroconductive parts by electric current heating provided by electrodes of different polarity applied to a free side of said electroconductive parts, said method comprising:

applying electrodes of different polarity to at least one of the parts to be welded, said electrodes comprising a central electrode surrounded by a counter electrode;

causing an electric current to flow from one of the electrodes to the other of the electrodes locally heating and welding the electroconductive parts together; and placing soldering material between the parts, wherein said applying includes contacting one of said electrodes to one of the parts and contacting the other of the electrodes to another of the electroconductive parts through an opening in the said one of the parts.

2. A method as claimed in claim 1 wherein said method includes forming said opening before said applying.

3. A method for assembling electroconductive parts by electric current heating provided by electrodes of different polarity applied to a free side of said electroconductive parts, said method comprising:

applying electrodes of different polarity to at least one of the parts to be welded, said electrodes comprising a central electrode surrounded by a counter electrode; and causing an electric current to flow from one of the electrodes to the other of the electrodes locally heating and welding the electroconductive parts together, wherein said applying includes contacting one of said electrodes to one of the parts and contacting the other of the electrodes to another of the electroconductive parts through an opening in the said one of the parts.

4. A method as claimed in claim 3 wherein said method includes forming said opening before said applying.

5. A method as claimed in claim 1 wherein said method includes applying a pressure to the electrodes to increase contact between the electrodes and the electroconductive parts.

6. A method for assembling electroconductive parts by electric current heating provided by electrodes of different polarity applied to a free side of said electroconductive parts, said method comprising:

applying electrodes of different polarity to at least one of the parts to be welded, said electrodes comprising a central electrode surrounded by a counter electrode;

causing an electric current to flow from one of the electrodes to the other of the electrodes locally heating and welding the electroconductive parts together; and applying a pressure to the electrodes to increase contact between the electrodes and the electroconductive parts, wherein said applying includes contacting one of said electrodes to one of the parts and contacting the other of the electrodes to another of the electroconductive parts through an opening in the said one of the parts.

7. A method as claimed in claim 6 wherein said method includes forming said opening before said applying.

8. A method as claimed in claim 7 wherein said method includes placing soldering material between the parts.

* * * * *

UNITED STATES PATENT AND TRADEMARK OFFICE
CERTIFICATE OF CORRECTION

PATENT NO.     : 6,459,064 B1
DATED          : October 1, 2002
INVENTOR(S)    : Trubert It is certified that error appears in the above-identified patent and that said Letters Patent is hereby corrected as shown below:

<u>Title page,</u>
Item [57], ABSTRACT, please amend the ABSTRACT to read as follows:

-- The invention concerns a method for assembling electroconductive parts by electric current heating. Said method is characterised in that it consists in moving forward electrodes (10, 20) with different polarities, towards the parts (30, 40) to be assembled, and in contacting said electrodes with at least one of the parts (30) to be assembled, current being applied to said electrodes (10, 20). Thus, the electroconductive parts (30, 40) are locally heated and assembled by the current flowing through them to pass from one electrode to the other. The invention also concerns a device for implementing said method and its use for assembling hollow parts, tubes or large dimension objects with sheet metal or other hollow parts. --

Signed and Sealed this

Twenty-ninth Day of July, 2003

JAMES E. ROGAN
*Director of the United States Patent and Trademark Office*